United States Patent
Mollett et al.

(10) Patent No.: US 6,755,344 B1
(45) Date of Patent: Jun. 29, 2004

(54) SYSTEMS AND METHODS FOR DETERMINING AN AUTHORIZATION THRESHOLD

(75) Inventors: Cassandra Mollett, Houston, TX (US); Alan Jay Bethscheider, Houston, TX (US); Susan Diane Brauckman, Katy, TX (US); David A. Walker, Richmond, TX (US); David Wayne Smith, Sugarland, TX (US)

(73) Assignee: First Data Corporation, Englewood, CO (US)

( * ) Notice: Subject to any disclaimer, the term of this patent is extended or adjusted under 35 U.S.C. 154(b) by 0 days.

(21) Appl. No.: 10/387,045

(22) Filed: Mar. 11, 2003

Related U.S. Application Data

(60) Provisional application No. 60/363,888, filed on Mar. 12, 2002.

(51) Int. Cl.[7] .............................. G06K 15/00; G06F 7/08
(52) U.S. Cl. ........................................ 235/383; 235/381
(58) Field of Search ................................ 235/383, 381, 235/375, 472, 380, 379; 705/23, 26, 16; 368/29, 239, 82

(56) References Cited

U.S. PATENT DOCUMENTS

| | | | |
|---|---|---|---|
| 5,696,739 A | | 12/1997 | Chang |
| 6,129,274 A | * | 10/2000 | Suzuki ........................ 235/381 |
| 6,169,460 B1 | | 1/2001 | Wordelman |
| 6,224,109 B1 | * | 5/2001 | Yang ........................... 283/77 |
| 6,507,851 B1 | * | 1/2003 | Fujiwara et al. ......... 707/104.1 |
| 6,522,772 B1 | * | 2/2003 | Morrison et al. ........... 382/124 |
| 6,594,641 B1 | * | 7/2003 | Southam ..................... 705/26 |
| 6,597,636 B1 | * | 7/2003 | Marchello ................... 368/29 |
| 2003/0132293 A1 | * | 7/2003 | Fitch et al. ................. 235/383 |
| 2003/0132294 A1 | * | 7/2003 | Gomez et al. .............. 235/383 |
| 2003/0132297 A1 | * | 7/2003 | McCall et al. ......... 235/472.01 |

OTHER PUBLICATIONS

"Liquor Stores in Colorado and Arkansas are First to Accept Payment, Perform Age Verification with VeriFone Multi–application Point of Sale", Press release, dated Jun. 20, 2001; www.verifone.com: 2 pages.

Website printout from www.merchant–pos–superstore.com; 6 pages.

"Completely POS: Lipman welcomes resellers as partners", article by Daniel Breemen, Managing Editor in 4 pages: 04/02; www.retailersystemsreseller.com.

* cited by examiner

Primary Examiner—Thien M. Le
(74) Attorney, Agent, or Firm—Knobbe, Martens, Olson & Bear LLP

(57) ABSTRACT

Systems and methods are described that determine a threshold value for an authorization check, such as an age verification, that is performed at a point of sale or other point of access control where access to a product, service, location, event, or the like, is restricted to individuals who meet an authorization threshold. In embodiments associated with purchases that comprise a variety of items for purchase and a variety of associated age-related authorization thresholds, systems and methods are described for determining an age-related authorization threshold for the purchase as a whole that will authorize the purchase of the items. In embodiments in which a purchaser's authorization is checked with respect to a determined threshold value, a record of the authorization check can be stored and can subsequently be retrieved to verify that an authorization check for the encounter was carried out using the determined threshold value.

77 Claims, 10 Drawing Sheets

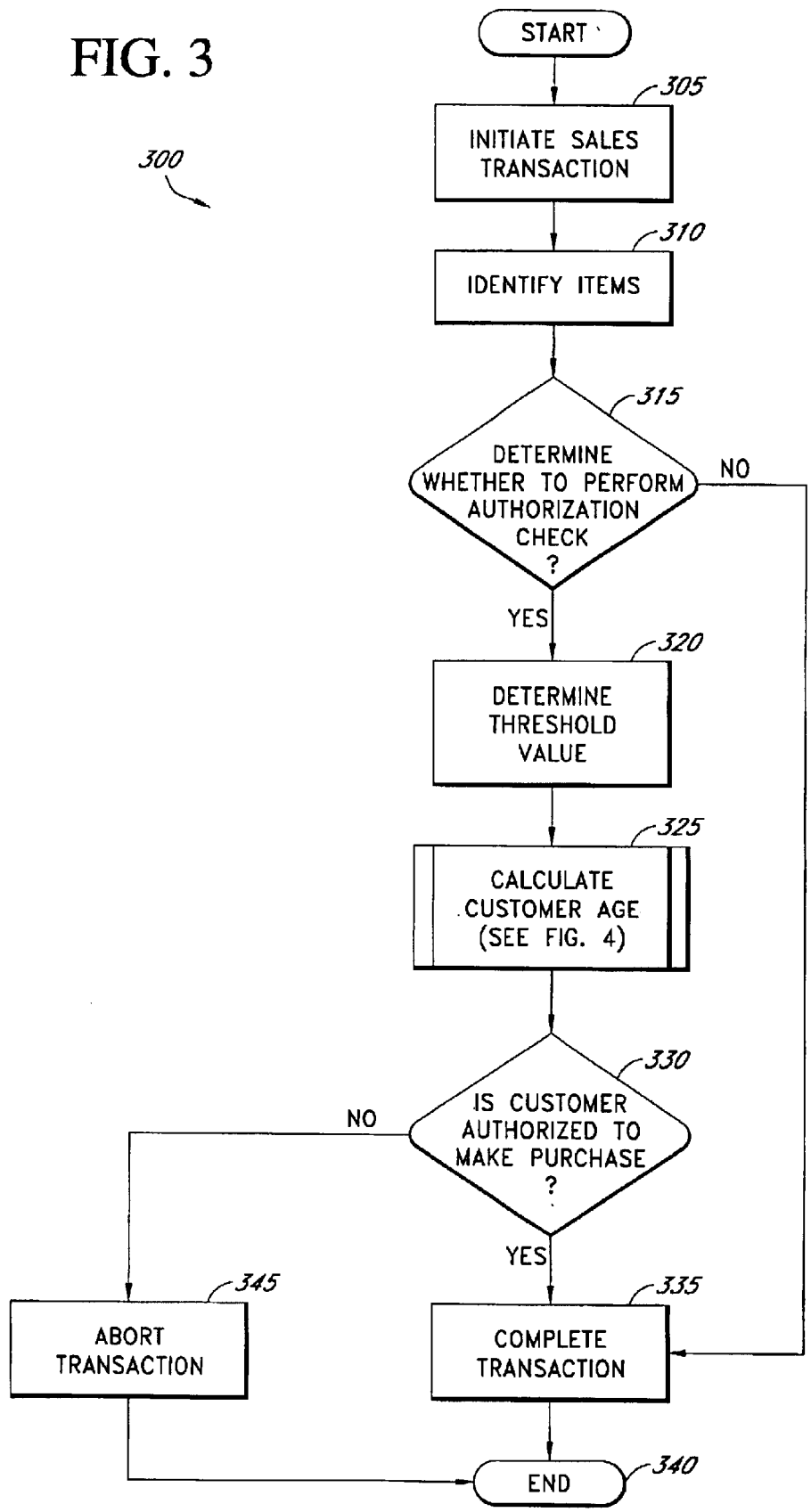

PRODUCTS DATABASE
| BAR CODE | RETAIL PRICE | TAXABLE? | AUTHORIZATION THRESHOLD | ... | |
|---|---|---|---|---|---|
|  | 6.57 | Y | 18 | ... | —505 |
|  | 1.29 | N | — | ... | —506 |
|  | 3.98 | Y | — | ... | —507 |
|  | 16.50 | Y | 21 | ... | —508 |
|  | 18.57 | Y | 18 | ... | —509 |
| ⋮ | | | — | | |
FIG. 5A

AGE CALCULATION REPORT

520

| DATE | TIME | TRANS NO. | CUST ID | ITEM TYPES ||||  AGE |
|------|------|-----------|---------|----------|---------|-------|----------|-----|
|      |      |           |         | TOBACCO | ALCOHOL | ADULT | GAMBLING |     |
| 090402 | 0119P | 9766 | CA-Z92703310 | 0 | 1 | 0 | 0 | 27 |
| 090402 | 0211P | 9768 | AZ-LP17923 | 1 | 0 | 0 | 0 | 19 |
| 090402 | 0536P | 9811 | CA-W3247911 | 0 | 1 | 0 | 1 | 47 |
| , | , | , | , | , | , | , | , | , |
| , | , | , | , | , | , | , | , | , |
| , | , | , | , | , | , | , | , | , |
| , | , | , | , | , | , | , | , | , |

AGE CALCULATION REPORT

| DATE | TIME | TRANS NO. | TOBACCO | ALCOHOL | ADULT | GAMBLING | AGE |
|------|------|-----------|---------|---------|-------|----------|-----|
| 090402 | 0119P | 9766 | 0 | 1 | 0 | 0 | 27 |
| 090402 | 0211P | 9768 | 1 | 0 | 0 | 0 | 19 |
| 090402 | 0536P | 9811 | 0 | 1 | 0 | 1 | 47 |
| ′ | ′ | ′ | ′ | ′ | ′ | ′ | ′ |
| ′ | ′ | ′ | ′ | ′ | ′ | ′ | ′ |
| ′ | ′ | ′ | ′ | ′ | ′ | ′ | ′ |
| ′ | ′ | ′ | ′ | ′ | ′ | ′ | ′ |

FIG. 5C

```
          ANY STORE, INC.
          2000 MAIN STREET
          HOMETOWN, CA 92000
          PHONE (987)654-3210
     = = = = = = = = = =

CHK 9766           SEP 04'02 01:19PM 1405406405
   1   FOOD ITEM              1.99

121770
   1   ALCOHOL ITEM           2.99

SUB TOTAL              4.98
       CASH                   5.00
       CHANGE DUE             0.02

= = = = = = = = = =

CALCULATED CUSTOMER AGE : 27
```

FIG. 6

SYSTEMS AND METHODS FOR DETERMINING AN AUTHORIZATION THRESHOLD

This application claims the benefit of priority under 35 U.S.C. §119(e) of U.S. Provisional Application No. 60/363,888 filed on Mar. 12, 2002 and entitled SYSTEMS AND METHODS OF CALCULATING AGE AT A POINT OF SALE DEVICE, the entirety of which is incorporated herein by reference.

REFERENCE TO RELATED APPLICATIONS

The present application is a member of the set of related, co-pending, and commonly owned U.S. Patent applications having the following titles, each of which was filed on even date herewith:

1. SYSTEMS AND METHODS FOR VERIFYING AUTHORIZATION
2. SYSTEMS AND METHODS FOR DETERMINING A NEED FOR AUTHORIZATION
3. SYSTEMS AND METHODS FOR DETERMINING AN AUTHORIZATION THRESHOLD
4. SYSTEMS AND METHODS FOR VERIFYING AUTHORIZATION FOR ELECTRONIC COMMERCE
5. SYSTEMS AND METHODS FOR DETERMINING AN AUTHORIZATION THRESHOLD FOR ELECTRONIC COMMERCE

Each of the above referenced patent applications is incorporated herein by reference in its entirety.

BACKGROUND OF THE INVENTION

1. Field of the Invention

The invention relates to systems and methods for retrievably storing the results of an age calculation or other authorization determination.

2. Description of the Related Art

Many situations exist in which a merchant or other businessperson is legally obligated to control the sale of certain goods or services by ensuring that customers meet a minimum age limit or are otherwise authorized to purchase the good or service. For example, clerks typically verify the age of customers who wish to purchase alcohol or tobacco products. Other products, such as fireworks, firearms, lottery tickets, adult-content literature, and other products, may also be age-controlled. In addition, merchants may be legally required to restrict the age of customers in other situations, such as at the entrance to a bar, casino, adult-entertainment establishment, or age-controlled movie. In many jurisdictions, merchants who do not fulfill their legal obligations to restrict access to age-controlled goods and services may be subject to fines, the loss of their license to do business, or other penalties.

However, in many situations where an authorization check may be indicated for some transactions, other transactions occur for which no check of authorization is needed. Furthermore, one transaction may comprise items with varying authorization thresholds. For example, a desired rental at a video rental store may comprise three movies, each associated with a different age-related authorization threshold, depending on the rating assigned to the movie. Similarly, grocery stores that sell alcohol and tobacco products, which can be associated with various age threshold restrictions, typically also sell other products that are not associated with any minimum age threshold.

Performing an authorization check that complies with legal and other requirements entails knowing a correct authorization threshold for a transaction that comprises one or more items, each of which may individually be associated with a different authorization threshold. In some current systems, determination of a correct authorization threshold for a transaction that comprises items associated with one or more individual authorization thresholds is carried out mentally by a clerk associated with the transaction. In such situations, correct determination of an appropriate authorization threshold can be subject to inaccuracies caused at least in part by stresses inherent in a point of sale setting as well as by lack of skill or care exercised by the clerk.

Furthermore, current systems that determine authorization, such as an authorization ,based on age, at a point of access control to a restricted item typically do not provide documentation of the age calculation or other authorization check associated with a given transaction, although such documentation could become very useful if a business establishment is accused of failing to comply with authorization regulations. For example, consider the situation in which an eighteen-year old customer uses false identification to purchase several items, including cigarettes and alcohol, and is subsequently apprehended by the law. If the customer prefers not to surrender the false identification used, but to claim instead that his or her true identification card was deemed by the clerk to be sufficient for the purchase, the merchant may be accused of selling the alcohol illegally. Without a record of the transaction and the associated identification check, the merchant may have difficulty establishing his or her compliance with the law.

Other forms of authorization requirements unrelated to age may also be mandated by law at a point of sale or other point of control for access to a product, a service, a location, an event, or the like. For example, in some jurisdictions, felons may be restricted from purchasing firearms. Additionally, even if age-checking or other authorization is not mandated by law, some products and situations exist for which a merchant may voluntarily wish to verify that customers' authorization has been checked, such as for insurance or other internal management purposes.

Hence, it will be appreciated from the foregoing that there is a need for authorization verification systems and methods that determine an authorization threshold that will authorize access to the items of a transaction. There is a further need for authorization verifications systems and methods that provide a retrievable record of the fact that a point-of-access-control authorization determination was performed for transactions requiring age-based or other types of authorization.

SUMMARY OF THE INVENTION

Systems and methods are described that determine a threshold value for an authorization check, such as an age verification, that is performed at a point of sale or other point of access control where access to a product, service, location, event, or the like, is restricted to individuals who meet an authorization threshold. In embodiments associated with purchases that comprise a variety of items for purchase and a variety of associated age-related authorization thresholds, systems and methods are described for determining an age-relared authorization threshold for the purchase as a whole that will authorize the purchase of the items. In embodiments in which a purchaser's authorization is checked with respect to a determined threshold value, a record of the authorization check can be stored and can subsequently be retrieved to verify that an authorization check for the encounter was carried out using the determined threshold value.

In various embodiments, the system uses a criterion other than age to determine that an individual is authorized to make a purchase or to otherwise participate in a transaction, and retains a record of the determination for subsequent retrieval.

An embodiment of a process is described for determining an age-related authorization threshold for a purchase comprising at least one item. The process comprises the acts of: (i) identifying an item that a purchaser is attempting to purchase; (ii) identifying an age-related authorization threshold associated with the item; (iii) repeating acts (i) and (ii) for the items of a purchase; (iv) selecting an authorization threshold to be the authorization threshold for the purchase; (v) calculating the age of the purchaser; and (vi) storing in a memory a record indicative of the purchase and of the calculated age of the purchaser.

An embodiment of a point of sale device is described for determining an age-related authorization threshold for a purchase that comprises a plurality of items. The point of sale device comprises an item identifier apparatus that is configured to identify items that a purchaser is attempting to purchase. The point of sale device comprises further a computer memory that is configured to store a database of age-related authorization information regarding items that are available for purchase, wherein the information comprises identification information for the items and age-related authorization thresholds associated with the items. The point of sale device further comprises a computer processor configured to receive a plurality of signals from the item identifier apparatus that identify the plurality of items of the purchase. The computer processor is further configured to use the received item identifier signals to access the database of age-related authorization information in the computer memory. The computer processor is further configured to determine, based at least in part on the age-related authorization information, an age-related authorization threshold that authorizes the purchase of the items.

An embodiment of a computerized system is described for determining an age-related authorization threshold for a purchase that comprises a plurality of items. The system comprises: means for obtaining electronic identifiers for a plurality of items that a purchaser is attempting to purchase; means for using the electronic identifiers to access a database of age-related authorization information associated with the items; and means for determining, based at least in part on the age-related authorization information, an age-related authorization threshold that authorizes the purchase of the items.

An embodiment of a software module is described. The software module gives a device the capability to obtain electronic identifiers for a plurality items that a purchaser is attempting to purchase; to use the electronic identifiers to access a database of age-related authorization information associated with the items; and to determine, based at least in part on the age-related authorization information, an age-related authorization threshold that authorizes the purchase of the items.

An embodiment of a computerized process is described for determining an age-related authorization threshold for a purchase comprising a plurality of items. The process comprises the acts of: obtaining electronic identifiers for a plurality items that a purchaser is attempting to purchase; using the electronic identifiers to access a database of age-related authorization information associated with the items; and determining, based at least in part on the age-related authorization information, an age-related authorization threshold that authorizes the purchase of the items.

An embodiment of a point-of-sale device is described for determining an age-related authorization threshold for a purchase that comprises at least one item. The point-of-sale device comprises: an item identifier apparatus that is configured to transmit identifying electronic signals associated with items that a purchaser wishes to purchase; a database of age-related authorization threshold information for items that are available for purchase; a table of electronically stored records that are associated with age calculations performed in association with purchases. The point-of-sale device further comprises a computer processor that is configured to receive the item-identifying signals from the item identifier apparatus, to use the item-identifying signals to access age-related authorization threshold information in the database that is related to the items in the purchase, and to select one of the accessed age-related authorization thresholds to be the age-related authorization threshold for the purchase. The computer processor is further configured to calculate the age of the purchaser and to store in the table a record indicative of the purchase and of the calculated age of the purchaser.

An embodiment of a process for determining an authorization threshold for a purchase comprising at least one item is described. The process comprises the acts of: (i) identifying an item associated with a purchase; (ii) accessing stored information about the item that is indicative of an authorization threshold associated with the item; (iii) repeating steps (i) and (ii) for each of the items in the purchase; and (iv) selecting one of the thresholds to be the authorization threshold for the purchase.

For purposes of summarizing the invention, certain aspects, advantages and novel features of the invention have been described herein. It is to be understood that not necessarily all such advantages may be achieved in accordance with any particular embodiment of the invention. Thus, the invention may be embodied or carried out in a manner that achieves or optimizes one advantage or group of advantages as taught herein without necessarily achieving other advantages as may be taught or suggested herein.

BRIEF DESCRIPTION OF THE DRAWINGS

FIG. 3 is a flow chart that depicts one embodiment of a transaction process that can comprise a verification of authorization based on age.

FIG. 5A depicts a sample embodiment of a products database.

FIG. 5B depicts a first sample embodiment of a record of age calculations performed.

FIG. 5C depicts a second sample embodiment of a record of age calculations performed.

FIG. 6 depicts a sample embodiment of a sales receipt comprising calculated age information.

DETAILED DESCRIPTION OF THE PREFERRED EMBODIMENTS

Figure 1A:
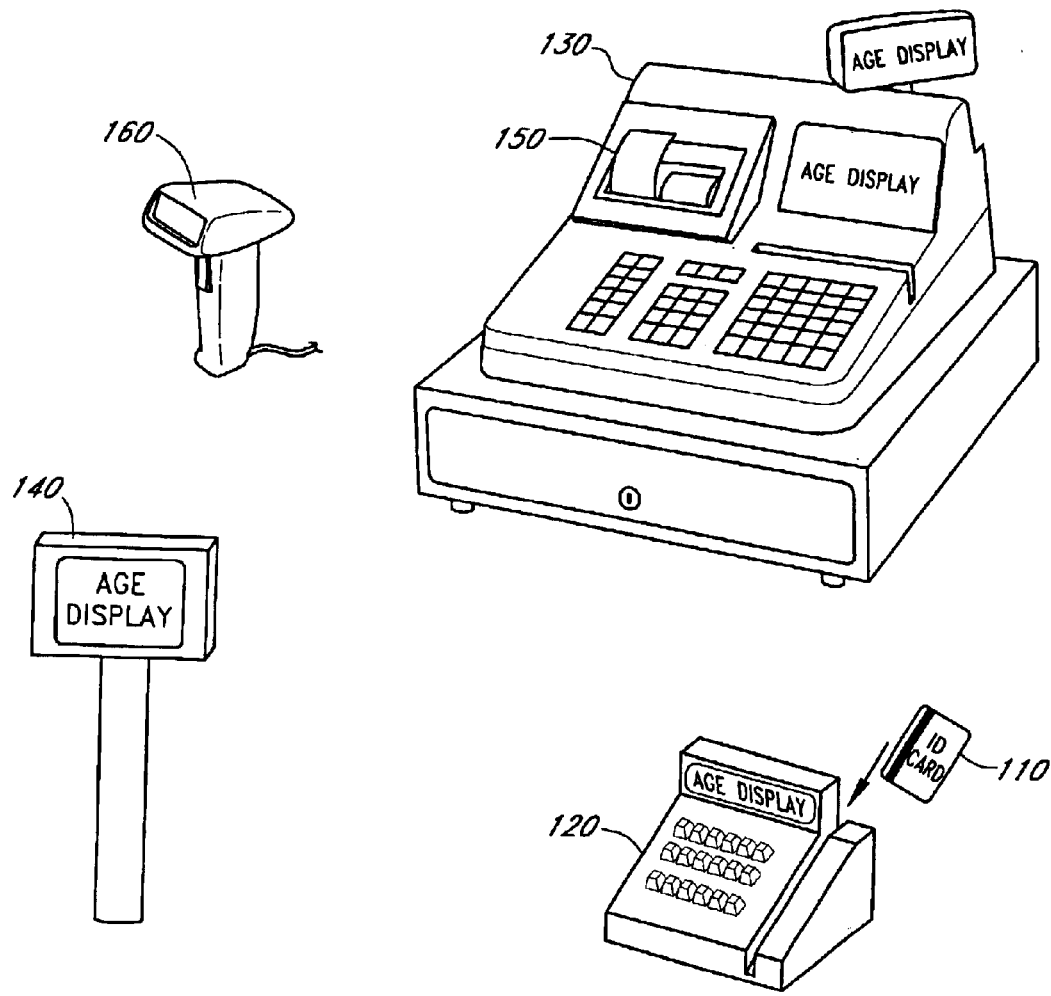
FIG. 1A depicts one embodiment of a point-of-sale terminal that can be used with the authorization verification systems and methods.

Systems and methods for determining authorization at a point of sale or other point of access control to a purchase, a service, a location, an event, information, or the like are described, wherein, in various embodiments, a need for authorization is determined, an authorization threshold is determined, authorization, or the lack thereof, is determined with respect to the authorization threshold, and a retrievable record of the authorization determination is stored so that performance of the authorization determination may subsequently be verified. In one embodiment, the systems and methods are used in conjunction with a purchase of items at a point of sale, wherein the items desired for purchase comprise at least one item that is associated with an age-related authorization threshold. For example, in a purchase of items at a grocery store, items containing alcohol or tobacco may be associated with age-related authorization thresholds, and sale of the items may not be permitted to a customer whose age is below the age-related threshold determined for the purchase.

Detailed embodiments of the present invention are disclosed herein. However, it is to be understood that the disclosed embodiments are merely exemplary of the authorization, verification systems and methods, which may be embodied in various forms. Therefore, specific structural and functional details disclosed herein are not to be interpreted as limiting, but merely as a basis for the claims and as a representative basis for teaching one skilled in the art to variously employ the methods in a wide variety of implementations.

For example, although embodiments of the authorization systems and methods are described herein as being implemented in conjunction with a system that uses age as an authorization requirement, other embodiments exist in which authorization is based on other requirements, including, but not limited to, citizenship, residence, membership, weight, security clearance level, or other authorizing characteristics. Furthermore, although some embodiments described herein refer to a minimum authorized age, such as a minimum authorized age for the purchase of tobacco or alcohol, other embodiments exist that refer to a maximum authorized age, such as a maximum age for which "child rates" for air travel or other tickets are authorized, or refer to an authorized range of ages.

Similarly, embodiments of the authorization verification systems and methods may be implemented in situations where criteria other than age are used to authorize an individual's participation in a controlled transaction or activity. For example, entry to a community center or permission to vote in a local election may be restricted to individuals residing within certain zip codes, and a purchase of firearms may be restricted non-felons. Storing a record that verifies that authorization was checked may be desirable in these situations.

Furthermore, although some embodiments of the authorization systems and methods are described herein as being implemented in conjunction with a purchase at a merchant's point-of-sale terminal, the systems and methods can also be implemented in other point of access control situations and/or locations where age calculation, or other type of authorization, is desirable. For example, in some embodiments, the systems and methods are utilized in conjunction with an electronic (e-commerce) transaction that may be initiated at a local or personal computer. Furthermore, the systems and methods may be utilized at other types of points-of-control that are not associated with a financial transaction. Therefore, the use of the terms "clerk," "merchant," "merchant representative," and the like are not meant to be limiting, but are intended to refer to a person, if any exists, who is facilitating the authorization process. In embodiments in which the systems and methods are automated, the functions of the "clerk" may be executed by suitably configured computer software and/or hardware. Likewise, the terms "customer," "purchaser," and "user" are intended to refer to a person whose authorization is being determined by the systems and methods described herein, without implying that the systems and methods must be associated with a purchase or other business transaction. The term "point of sale" is intended to refer to a point of control where access to a product, event, location, service, or the like can be granted or denied. The terms "product" "offering," and "item" are not intended to be limited to physical objects available for purchase, but, as has been described, may also refer to a service, information, event, location, or other like to which access may be limited according to a measure of authorization. Similarly, the terms "purchase," "transaction," and "encounter" may refer to an event in with authorization is determined for access.

Referring to the drawings in more detail:

FIG. 1A depicts one embodiment of a point-of-sale terminal 130 with an associated magnetic-stripe reading device 120, a bar code scanner 160, and a variety of additional display that can implement embodiments of the authorization verification systems and methods. The embodiment shown in FIG. 1A can be used, for example, in conjunction with a point-of-sale purchase of age-controlled products and with an authorization that is based on an age threshold that is performed in association with the purchase.

In the embodiment shown in FIG. 1A, the magnetic-stripe reading device 120 allows for the input of personal information regarding an individual from an appropriately configured magnetic stripe on a driver's license, credit card, or other identification card 110. The personal information read from the magnetic stripe may comprise the individual's birth date, citizenship, or other legally identifying features. In some embodiments, having the individual's birth date allows for the calculation of the individual's current age.

In some embodiments, the personal information may not comprise the individual's birth date, but may provide access to stored birth date information for the individual. For example, biometric input, such as a fingerprint, a palm print, an iris or retina scan, a facial pattern, or a voice sample, may be used, in embodiments with other input devices, as personal information that allows the system to link to other available data, such as a database of stored personal information, wherein the stored personal information does comprise the individual's birth date. In'some embodiments, personal information comprising the individual's birth date may be input using, by way of example, a smart card, a bar code, a transponder, a cell phone, a personal digital assistant, other wireless device, a security key, a computer "cookie" file or other file, manual keyboard input, or other device or method for communicating data.

In some embodiments, as an addition or an alternative to personal information that is entered electronically, personal information can also be entered to the system manually (as when a clerk types in a birth date read from an identification card), orally (as when the clerk speaks the birth date into a suitable input device), or by any of a variety of other methods.

In the embodiment shown in FIG. 1A, the bar code reader 160 allows for the input of identifying information regarding products that comprise the purchase. In some embodiments, the identifying information about the products allows for access to additional stored information about the products, as is described in greater detail with reference to the sample products database in FIG. 5A. In some embodiments, the additional stored information about the products may comprise information indicative of whether the purchase of a product requires authorization, such as a verification of the purchaser's age, before the purchase can be completed.

In some embodiments, input of information regarding the products and/or services associated with the transaction is implemented by using a different type of bar code reader, by manually keying in identifying information, or by another method of information input.

In some embodiments, the age calculation and verification systems and methods may be implemented as one or more software modules that are easily implemented on existing equipment at a point of sale. The point-of-sale terminal 130, the magnetic-stripe reading device 120, the bar code reader 160, and the additional display 140 are items that may commonly exist at a point of sale, thereby illustrating the fact that the systems and methods may, in some embodiments, be implemented at a point of sale without the need for additional hardware. In some embodiments, the point-of-sale terminal 130, the magnetic-stripe-reading device 120, the bar code reader 160, and/or the additional display 140 are connected by way of a computer network to additional computer storage and processor hardware.

In the embodiment shown in FIG. 1A, software for performing the age calculation and verification may be executed, for example, by a processor or other circuitry located within the point-of-sale terminal 130, by a computer device networked to the point-of-sale terminal 130, and may alternatively or additionally be executed by a processor or other circuitry located within the associated magnetic-stripe reading device 120 or other peripheral device. The processors may comprise, by way of example, personal computers (PCs), mainframe computers, other processors, program logic, or other substrate configurations representing data and instructions, which operate as described herein. In other embodiments, the processors may comprise controller circuitry, processor circuitry, processors, general purpose single-chip or multi-chip microprocessors, digital signal processors, embedded microprocessors, microcontrollers and the like.

As illustrated in FIG. 1A, several options exist for displaying the results of an age calculation authorization. For example, the results, such as a calculated age or other appropriate message, can be displayed in the LCD or other display window of the magnetic-stripe-reading device 120. The results may additionally or alternatively be displayed in a display window associated with the point-of-sale terminal 130 or with an additional display 140 at the point of sale or at another appropriate location. Age calculation results may also be printed on a sales receipt 150 associated with a given transaction, as will be described in greater detail with reference to the sample receipt of FIG. 6.

In some embodiments in which the authorization is based on age, the results of an age calculation may be displayed in numeric form, where a number represents the individual's age in years. In some embodiments, the age calculation results may comprise additional information. For example, in one embodiment, to emphasize the fact that the age calculation system is not configured to authenticate an identification card or to guarantee an individual's age, the age calculation results may be displayed in a format similar to the following:

---
If today is Jul. 5, 2002
and
The consumer's birth date is Jan. 19, 1963
The consumer's age is 39
---

In one embodiment, the results of an age calculation may be electronically stored along with other data in a transaction record in the point-of-sale terminal 130. In other embodiments, a record of the age calculation may be stored in the magnetic-stripe-reading device 120 or other peripheral device. In yet other embodiments, a record of the age calculation may be stored in a computer memory that is accessible to the point-of-sale terminal 130 by way of a computer network.

Figure 1B:
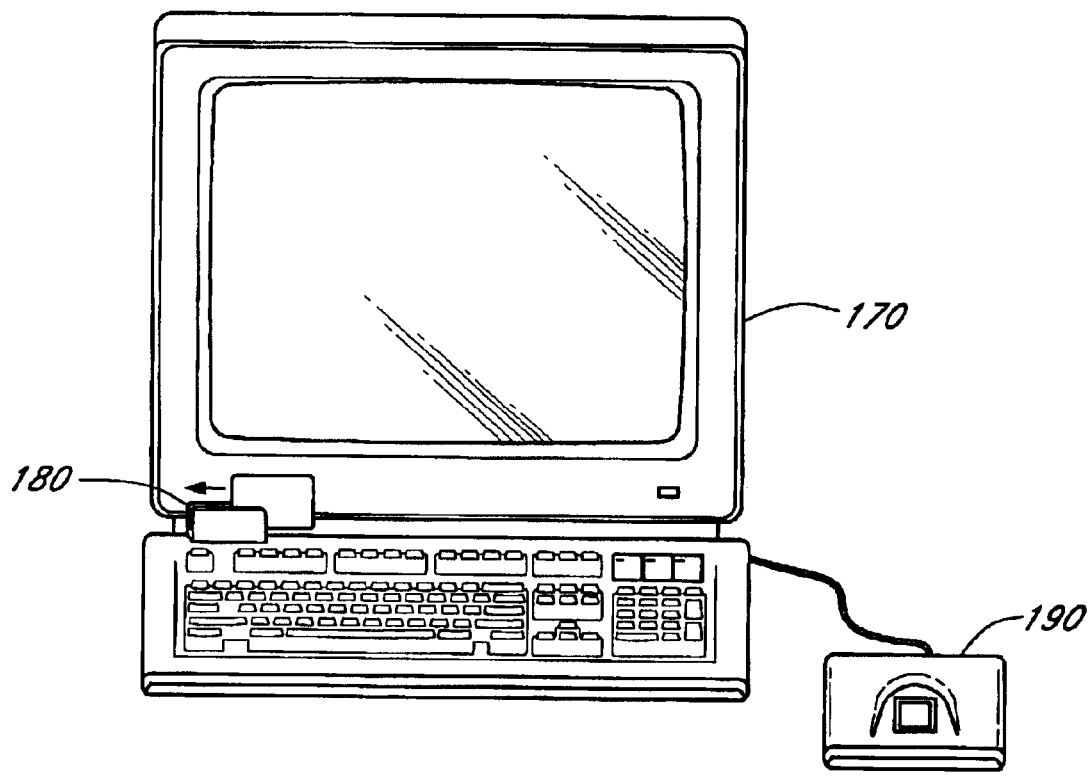
FIG. 1B depicts one embodiment of a local computer that can be used with the authorization verification systems and methods.

FIG. 1B depicts one embodiment of a local computer 170, such as a personal computer (PC), which can implement embodiments of the authorization verification systems and methods. In one embodiment, the individual may use the local computer 170 in order to participate in an electronic commerce (e-commerce) transaction, for example a purchase of age-controlled goods and/or services over a communication network, such as the Internet. In one embodiment, the individual may use the computer 170 to participate in a game with other individuals, for which an age threshold or other authorization requirement is enforced. In other embodiments, the local computer 170 may be used to access goods, services, and/or information, or for another type of interaction for which authorization verification is desirable.

In these and other embodiments, the local computer 170 may serve as a "point of sale" or as a "point of access control," although the local computer 170 may be situated, for example, at the individual's home, office, or automobile.

The local computer 170 may be embodied in forms other than a PC, as will be described in greater detail with reference to FIG. 2B below. As portrayed in FIG. 1B, the local computer 170 may be configured to receive input from a magnetic stripe reader 180. The magnetic stripe reader 180 or other input device may be configured to extract personal information about the individual from the magnetic stripe of a driver's license, credit card, frequent flyer card, smart card, or from another suitably configured card or device. The personal information read from the magnetic stripe may comprise the individual's birth date, citizenship, or other legally identifying features. In some embodiments, having the individual's birth date allows for the calculation of the individual's current age.

In one embodiment, the magnetic stripe reader 180 may be constructed to form an integral part of the local computer 170, such as, for example, a part of the computer keyboard. In some embodiments, the magnetic stripe reader 180 or other input device may be implemented as a stand-alone peripheral device. In other embodiments, the computer keyboard itself serves as an input device for inputting personal information related to authorization and other information about a desired transaction.

As is further portrayed in the embodiment of FIG. 1B, the local computer 170 is configured to receive input from a fingerpad 190 device, which can accept biometric input, such as a fingerprint, and can transmit an electronic version of the input to the local computer 170 for use by the authorization verification systems and methods. In other embodiments, other methods are used for transmitting other forms of biometric data about the individual to the local computer 170, as was described with reference to FIG. 1A. In some embodiments, biometric data, from a fingerpad 190, camera, microphone, scanner, or other suitable device, can be used to identify the individual and to access additional stored information about the individual that may be relevant to a point-of-access-control authorization for an e-commerce transaction.

In other embodiments, other devices and methods may be used to input personal and other information for the authorization verification systems and methods. For example, in one embodiment, a bar code or other scanner, touch screen, or microphone may be configured as a peripheral to the local computer 170 and may transmit information about products associated with a transaction to the local computer 170 for use by the authorization verification systems and methods. In other embodiments associated with online or e-commerce transactions, information for use by embodiments of the authorization verification systems and methods may be input using, by way of example, a smart card, a bar code, a transponder, a cell phone, a personal digital assistant, other wireless device, a security key, a computer "cookie" file or other file, manual keyboard input, or other device or method for communicating data.

In some embodiments, as an addition or an alternative to information that is entered electronically, personal information can also be entered to the system manually (as when an individual types in a birth date), orally (as when the individual speaks the birth date into a suitable input device), or by any of a variety of other methods.

As was the case with the embodiment shown in FIG. 1A, the authorization verification systems and methods may store a retrievable record of an authorization determination performed. In one embodiment, the record is stored within computer memory resident in the local computer 170. In one embodiment, the record is stored by a remote server that is in communication with the local computer, as will be described in greater detail with reference to FIG. 2B. In other embodiments, other methods and locations are used for storing a record of an authorization check performed in conjunction with a transaction.

Figure 2A:
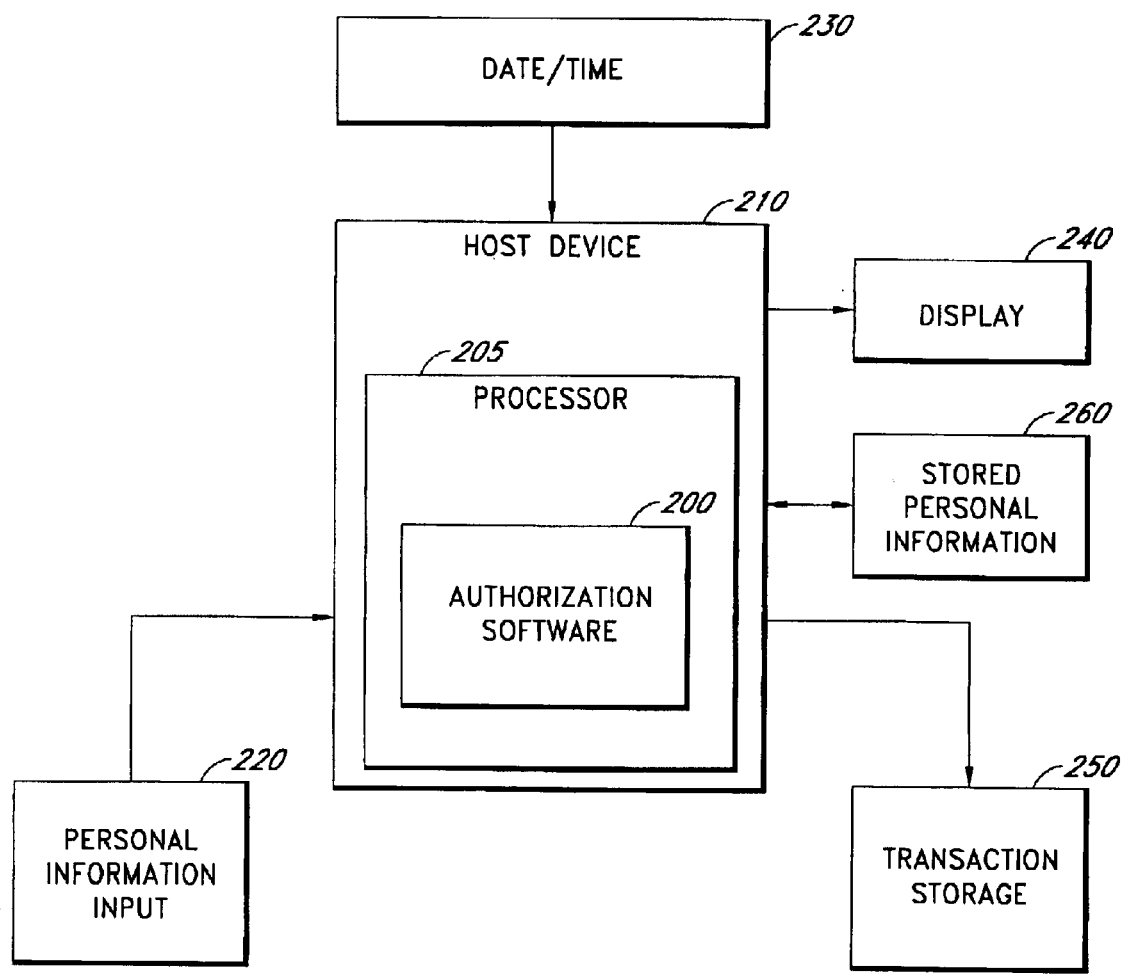
FIG. 2A is a block diagram that depicts one embodiment of an authorization verification system.

FIG. 2A is a block diagram that depicts a broad overview of one embodiment of an authorization verification system, in which authorization is based on an age calculation.

As shown in FIG. 2A, authorization software 200 is executed on a processor 205 in a host device 210. The host device 210 may be embodied in a variety of forms. For example, the host device 210 may be a point-of-sale terminal or other computerized cash register as was depicted in FIG. 1A. Alternatively, the host device 210 may be an interactive kiosk or other stand-alone device for determining authorization at a point of sale or other point of control. The host device 210 may also be embodied in other forms.

The processor 205 may comprise, by way of example, program logic, or other substrate configurations representing data and instructions, which operate as described herein. In other embodiments, the processor may comprise controller circuitry, processor circuitry, one: or more general purpose single-chip or multi-chip microprocessors, digital signal processor, embedded microprocessor, microcontroller and the like.

In one embodiment, the authorization software 290 comprises program logic that may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, circuitry, data, databases, data structures, tables, arrays, or variables.

As shown in FIG. 2A, information about the current date and/or time 230 is available to the host device 210. In one embodiment, the date/time information 230 is provided by an internal clock or other component that resides within the host device 210. In one embodiments, the date/time information 230 is received by the host device 210 and the processor 205 from a source external to the host. In some embodiments, the date/time information 230 is available as a measurement of time that can be used to calculate a date. In other embodiments, the date/time information 230 is available in other formats that allow for identification of the current date. In embodiments where authorization is determined by measures other than age, other types of auxiliary information may be used by the authorization verification systems and methods.

The host device 210 also receives personal information 220 about an individual as input. In one embodiment, the personal information 220 may take the form of identification information, comprising a birth date, which can be retrieved from a magnetic stripe on individual's driver's license or other identification card when the card is swiped through a suitable input device or is otherwise made available for reading by a merchant representative or by the individual.

Alternatively, the personal information 220 may be embodied as a birth date that is keyed in manually, input orally, or otherwise entered by a merchant representative or by the individual. The personal information 220 may also take the form of other identifying information that may not comprise a birth date, but that can be used as a link to available, stored information about the individual, wherein the stored information comprises birth date information for the individual. Personal information 220 that comprises birth date information or a link to birth date information may also be input using any of a variety of methods, including, but not limited to, a smart card, a bar code, a transponder, a cell phone, a personal digital assistant, a security key, a computer "cookie" file or other file, biometric input, or some other device or method for communicating data.

As will be described in greater detail with reference to FIG. 4, in some embodiments the personal information 220 may also comprise information about the validity of the source of personal information 220. For example, if the personal information 220 is being received from an individual's driver's license, the personal information 220 may additionally comprise expiration date information for the driver's license.

In some embodiments, the personal information 220 received may not comprise sufficient information about the individual to allow for determining authorization, but may provide access to additional information. For example, when age is used a basis for determining authorization, the personal information 220 received may not comprise a birth date for the individual, but may provide a link to stored personal information 260 that does comprise the individual's birth date. The stored personal information 260 may be stored externally to the host device 210, as is shown in FIG. 2A, and may be accessed by the host device via local or remote computer network, or by other communication systems and methods. In other embodiments, the stored personal information 260 may be stored internally to the host device 210.

In the embodiment shown in FIG. 2A, using the date/time information 230 and the personal information 220 received, the authorization software 200 calculates the current age of the individual, or otherwise determines the authorization or lack thereof of the individual. The host device 210 may send the age information to a display 240 that can be embodied in a variety of forms. For example, several types of display are described with reference to FIG. 1A, including, as one example, a message that is printed on a receipt or other record of the transaction.

The host device 210 can, additionally or alternatively, send a copy of the authorization determination results to be stored as a retrievable record in a transaction storage repository 250 that can be external to the host device 210, as depicted in the FIG. 2A example, and/or can be internal to the host device 210. In some embodiments, the authorization information can be associated with other relevant information for storage.

For example, in one embodiment where authorization is used for age-cotrolled purchases, the authorization verification system keeps an audit report of each age calculation record, wherein each record comprises the time of the calculation and the age calculated. In other embodiments, the audit report, transaction log, or other retrievable record of the calculation may comprise some, all, or none of the following information: customer's driver's license or other identification number, clerk's name and/or identification, amount of purchase, items purchased, types of items purchased, and any other relevant information, as permitted by law. Information stored in the transaction storage 250 of one example embodiment is described in greater detail with reference to FIGS. 5B and 5C below.

In some embodiments, the authorization record is stored in the transaction store 250 for a limited period of time, such as for one day or for one month, after which time the record is purged from the transaction storage 250. In one embodiment, new authorization records are stored in the transaction storage 250, and as storage capacity within the transaction store 250 becomes limited, older records are deleted to make room for the new. In other embodiments, other storage systems and methods are employed, as will be familiar to one of ordinary skill in the art.

The record of the authorization determination that is stored in the transaction store 250 can be subsequently retrieved and reviewed in order to verify whether an authorization determination was performed in conjunction with a given transaction. In various embodiments, depending on the content of the record and the length of time for which it is stored verification that an authorization was performed for a given transaction, for a given individual, or for some other criteria, may later be carried out.

Figure 2B:
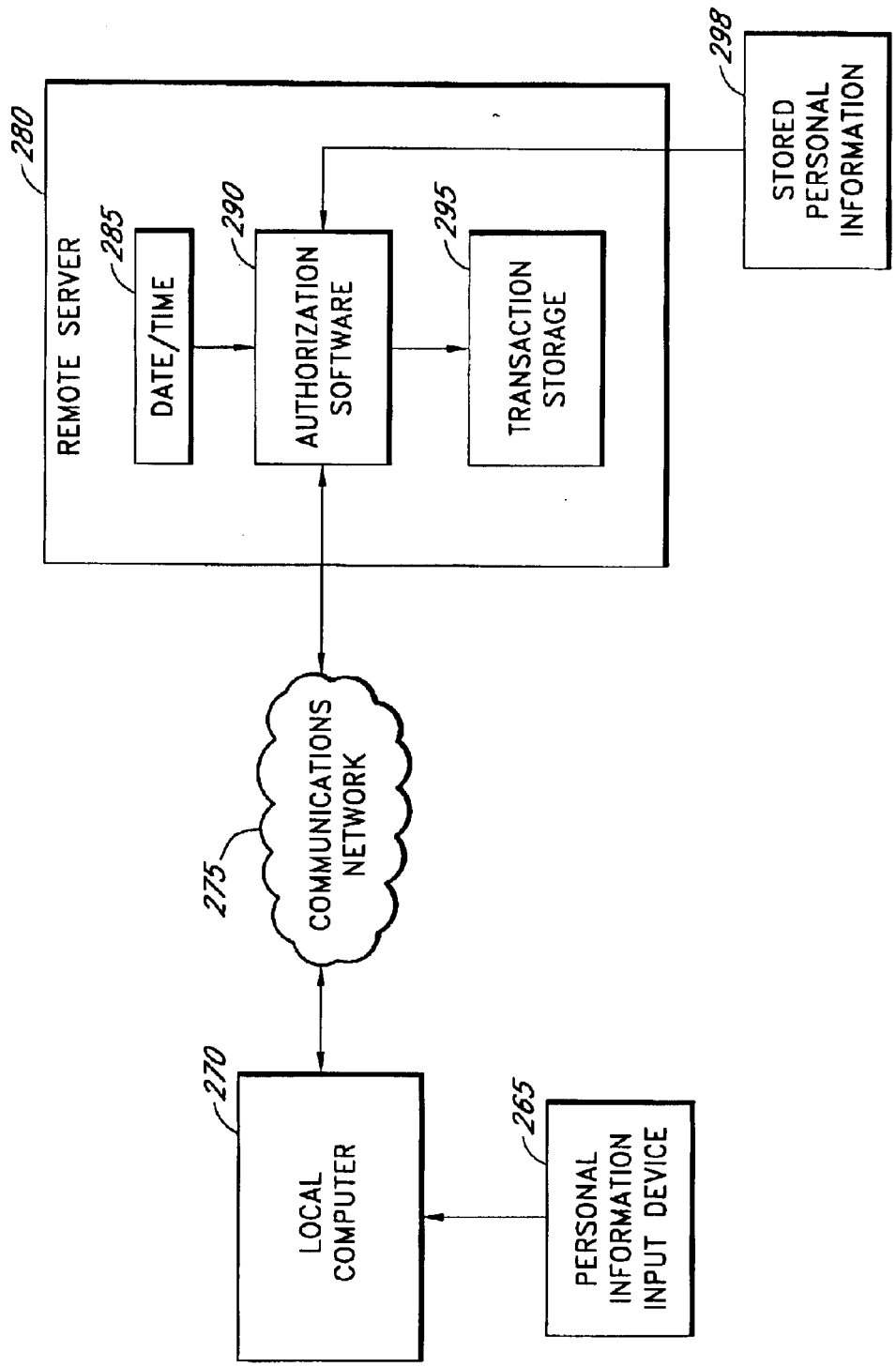
FIG. 2B is a block diagram that depicts one embodiment of an authorization verification system for electronic commerce.

FIG. 2B is a block diagram that depicts a broad overview of one embodiment of an authorization verification system in which authorization is determined in association with an e-commerce transaction. For example, as was described with reference to FIG. 1B, the system may be used in conjunction with an online purchase, with access to online information or entertainment, or with other computer-accessed or electronically-accessed produts, services, and activities.

As shown in FIG. 2B, a local computer 270 is a device that allows a user to interact with a remote server 280 using a communications network 275. In one embodiment, the local computer 270 is a conventional computer that is equipped with a conventional modem. In other embodiments, the local computer 270 can be any device that allows an individual using the local computer 270 to interact with the authorization verification system, such as, for example, a computer workstation, a local area network of individual computers, a kiosk, a personal digital assistant, an interactive wireless communications device, an interactive television, a transponder, or the like.

As shown in FIG. 2B, the local computer 270 communicates via a communications device, network 275 with a remote server 280. In one embodiment, the communications network 275 is a global network of computers, such as the Internet. In other embodiments, the communications network 275 can be any communication system including by way of example, dedicated communication lines, telephone networks, wireless data transmission system, two-way cable systems, customized computer networks, interactive kiosk network, automatic teller machine networks, interactive television networks, intranets, and the like.

In one embodiment, the remote server 280 operates one or more websites on the World Wide Web. In other embodiments the remote server 280 can be any device that interacts with or provides data to the local computer 270, including by way of example, any internet site, private network, network server, video delivery system, audio-visual media provider, television programming provider, telephone switching network, teller network, wireless communication center and the like.

In one embodiment, the remote server 280 is associated with one or more web pages that offer age-controlled products or services for purchase via the Internet. In one embodiment, the remote server 280 is associated with a web site that offers age-controlled participation in games or other online events. In one embodiment, the remote server 280 offers authorization verification services to other e-commerce sites that desire to have a record of authorizations performed for their e-commerce transactions. In other embodiments, the remote server 280 performs authorization determination and verification associated with the local computer 270 for other reasons.

As further shown in FIG. 2B, a personal information input device 265 can be used to input personal information useful for an authorization determination to the local computer 270. In one embodiment, the personal information input device 265 is a magnetic stripe reader 180 as was depicted in FIG. 1B. In one embodiment, the personal information input device 265 is a fingerpad 190, or other biometric input device, as was also depicted in FIG. 1B. In one embodiment, the input device is a scanner with optical character recognition capabilities that can read information printed on a suitable information medium. In other embodiments, other types of information input devices 265 may also be used in conjunction with the authorization verification systems and methods described. Personal information may also be input using any of a variety of methods, including, but not limited to, a smart card, a bar code, a transponder, a cell phone, a personal digital assistant, a security key, a computer "cookie" file or other file, a microphone, computer keyboard, touchscreen, or other device or method for communicating data.

In one embodiment, personal information useful to the authorization verification systems and methods may be previously stored in the local computer 270 and may be accessed by the local computer 270 for that purpose with or without a need for input from a personal information input device 265.

In the embodiment shown in FIG. 2B, the local computer 270 communicates information received from the personal information input device 265 to the remote server 280 via the communications network 275 for purposes of authorization verification associated with an e-commerce transaction.

In one embodiment, determining the authorization, or lack thereof, of an individual associated with the local computer 270 is performed by authorization software 290 used by the remote server 280.

In one embodiment, the authorization software 290 comprises program logic that may advantageously be implemented as one or more modules. The modules may advantageously be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

In embodiments where authorization is based on age, the authorization software 200 may calculate the current age of the individual using information about the current date and/or time along with the personal information received from the local computer 270.

In some embodiments, the personal information received from the local computer 270 may not comprise sufficient information about the individual to allow for determining authorization, but may provide access to additional information. For example, when age is used a basis for determining authorization, the personal information received may not comprise a birth date for the individual, but may provide a link to stored personal information 298 that does comprise the individual's birth date. The stored personal information 298 may be stored externally to the remote server 280, as is shown in FIG. 2B, and may be accessed by the remote server 280 via local or remote computer network, or by other communication systems and methods. In other embodiments, the stored personal information 298 may be stored internally to the remote server 280.

As shown in FIG. 2B, information about the current date and/or time 285 is available to the authorization software 290 in the remote server 280. In one embodiment, as depicted in FIG. 2B, the date/time information 285 is provided by an internal clock or other component that resides within the remote server 280. In one embodiment, the date/time information 230 is accessed by the remote server 280 via computer network from a source external to the server 280. In another embodiment, date and/or time information 285 from a source within the local computer 270 may be used. In some embodiments, the date/time information 285 is available as a measurement of time that can be used to calculate a date. In other embodiments, the date/time information 230 is available in other formats that allow for identification of the current date.

In some embodiments in which authorization is based on age, and in which current age is determined based in part on output from a computer-resident clock, it may be desirable to use a clock that is internal to the remote server 280 rather than a clock resident in local computer 270, because of inconsistency in the accuracy of computer-resident clocks in local computers 270.

Using the date/time information 285 and the personal information received from the local computer 270, the authorization software 290 calculates the current age of the individual otherwise determines the authorization or lack thereof of the individual whose personal information was entered.

Once an authorization determination is made, in one embodiment, the remote server 280 may send a message informing the user of the local computer 270 of the authorization results. In one embodiment, where the remote server 280 is executing the authorization verification on behalf of another web site, web server, or other entity, the remote server 280 may send a message informing the entity of the authorization results.

The remote server 280 can additionally, or alternatively, send a copy of the authorization determination results to be stored as a retrievable record in a transaction storage repository 295 that can be internal to the remote server 280, as depicted in the FIG. 2B example, and/or can be external to the remote server 280. In some embodiments, the authorization information can be associated with other relevant information for storage.

As was described with reference to the embodiment depicted in FIG. 2A, in one embodiment where authorization is used for age-controlled purchases, the authorization verification system keeps an audit report of each age calculation record, wherein each record comprises the time of the calculation and the age calculated. In other embodiments, the audit report, transaction log, or other retrievable record of the calculation may comprise some, all, or none of the following information: customer's driver's license or other identification number, Internet address or other identifier for the local computer 270, amount of purchase, items purchased, types of items purchased, and any other relevant information, as permitted by law. Information stored in the transaction storage 295 of one example embodiment is described in greater detail with reference to FIGS. 5B and 5C below.

In one embodiment, the authorization record is stored in the transaction storage 295 for a limited period of time, such as for one day or for one month, after which time the record is purged from the transaction storage 295. In one embodiment, new authorization records are stored in the transaction storage 295, and as storage capacity within the transaction storage 295 becomes limited, older records are deleted to make room for the new. In other embodiments, other storage systems and methods are employed, as will be familiar to one of ordinary skill in the art.

FIG. 3 is a flow chart that depicts one embodiment of a process 300 for conducing a sales transaction that comprises an authorization by age calculation for a minimum authorized age. By way of example, the process 300 is described as being implemented at a point-of-sale terminal with a scanning device that is configured to read scanable codes, such as bar codes, affixed to products desired for purchase by a customer. However, the process 300, with modifications familiar to one of ordinary skill in the art, can also be implemented in conjunction with an e-commerce transaction. For example, in most e-commerce transactions, automated processes carry out functions that are described in the FIG. 3 flowchart as being executed by a point of sale clerk. As will further be familiar to one of ordinary skill in the art, the process 300 can also be implemented in other point of access control situations in which authorization determination and verification is desirable.

The process 300 begins at state 305, where a sales transaction is initiated. From state 305, the process 300 moves to state 310, where a clerk or purchaser identifies items to be purchased. In one embodiment, items to be purchased are identified by scanning a bar code affixed to the items.

Moving on to state 315, the process 300 determines whether to perform an authorization check. In one embodiment, an authorization check is performed whenever any of the identified items are among those for which age restrictions are imposed on purchasers. A practitioner reasonably skilled in the art will appreciate that this determination may be implemented and executed by any one of a number of methods without departing from the spirit of the invention. As one example, look-up tables that allow access to relevant restriction information based on identifiers associated with the scanned items may advantageously be used. One example of a product database that can fulfill this look-up table role is depicted in FIG. 5A below.

In other embodiments, authorization checks may not be performed every time an item associated with a restriction is identified as being amongst the items to be purchased. For example, in one embodiment, authorization checks are performed randomly for purchases comprising restricted items. In one embodiment, authorization checks are performed when restricted items, or combinations of restricted items, that have been previously identified as being amongst those that are most frequently associated with attempted unauthorized purchases are included in the current purchase. In other embodiments, other considerations may affect the decision whether to perform an authorization check for the current purchase transaction.

If the process determines in state 315 either that no restricted items exist amongst the purchase items, or that for other reasons, an authorization check need not be carried out, the process 300 proceeds to state 340, where the sales transaction is completed normally.

If, in state 315, the process 300 determines that an authorization check will be carried out, the process 300 moves to state 320 where the process 300 determines the authorization threshold value, such as, by way of example, a minimum authorized age, for the set of scanned items. For example, in one embodiment, a set of scanned items that includes one item with a minimum age threshold of eighteen and one item with minimum age of twenty-one may determine an overall minimum age threshold of twenty-one for the set of scanned items, since twenty-one is the minimum age that satisfies the authorization threshold for all items of the sets. As was described with reference to state 310, a practitioner reasonably skilled in the art will appreciate that this determination may be implemented and executed by any one of a number of methods, without departing from the spirit of the invention. In other situations, it may be desirable to select the lowest threshold to be the threshold for the set. In still other situations, it may be desirable to construct, from the age thresholds of the items in a purchase, a range of acceptable ages that are authorized to allow the purchase In state 325, the process 300 calculates the age or other authorization measure of the customer, as will be described in greater detail with reference to FIG. 4. In the embodiment described in FIG. 4, execution of the age calculation process comprises storing a retrievable record of the age calculation.

In state 330, the process 300 compares the customer age calculated in state 325 with the authorized threshold age that was identified in state 320, and determines whether the customer wishing to purchase the scanned items is legally authorized to do so. If the process 300 determines that the customer authorized to make the desired purchase, the process 300 moves to state 340, where the transaction is completed normally, and the process 300 ends in state 380.

If, in state 330, the process determines that the customer is not authorized to make the desired purchase, the process 300 moves to state 345, where the transaction is aborted and finally ends in state 380. In other embodiments, if in state 330, the process determines that the customer is not authorized to purchase the set of scanned items, the process 300 may allow the transaction to be completed if the age-controlled items for which the customer is not authorized to purchase are removed from the transaction. For example, in one embodiment where items are added to a purchase receipt during scanning, an item is not added to the receipt until the customer's authorization to purchase the item is verified. In still other embodiments, when a determination is made that the customer is not authorized to make the desired purchase, control of the transaction may be transferred to a clerk or other merchant representative associated with the transaction so that the situation may be resolved.

As will be apparent to one of ordinary skill in the art, the various states of process 300 may be configured and carried out in any one of a variety of ways without departing from the spirit of the invention. For example, in one embodiment, the customer's age is determined prior to scanning the items, and as each item is scanned, a determination is made regarding the customer's authorization to purchase the item, such that a visual, audible, printed or other form of notification may be made by the system, either at the time of scanning or at the end of scanning, or both, notifying the clerk of the customer's lack of authorization to purchase the item. Other embodiments of the process 300 are also envisioned.

As was stated with reference to state 315 above, in some embodiments, age calculation or other authorization determination is carried out for every transaction. In some embodiments, age calculation or other authorization determination may be triggered automatically by the presence of an item or situation requiring authorization. In some embodiments, age calculation or other authorization determination may be initiated by a determination on the part of an associated clerk that such an authorization determination is warranted. These and other embodiments will be recognized by one of ordinary skill in the art as reasonable variations of the systems and methods described herein.

Figure 4:
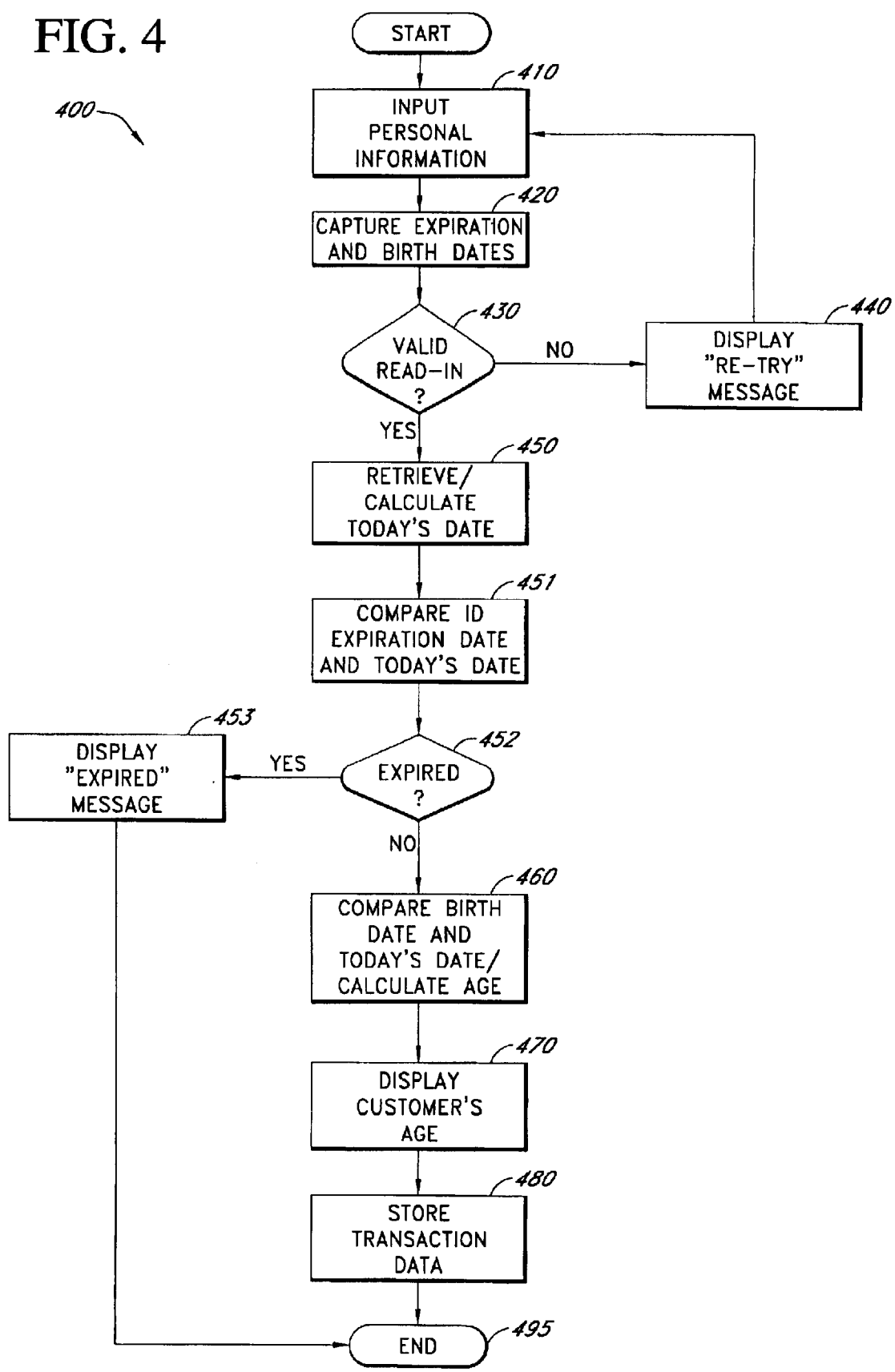
FIG. 4 is a flow chart that depicts one embodiment of a process to calculate, display, and store a record of an authorization based on age.

FIG. 4 is a flow chart that describes one embodiment of a process 400 to determine authorization by calculating the age of a person on a point-of-sale device and to display and store a record of the authorization determination. The process 400 described in FIG. 4 is one embodiment of the age calculation process mentioned with reference to state 325 from FIG. 3. Although the process 400 is described as taking place at a point-of-sale device, one of ordinary skill in the art will recognize that the process 400 could be implemented in an e-commerce or other suitable setting with familiar modifications that need not require undue experimentation.

Referring now to the process 400 as it is depicted in FIG. 4, from a start state, the process 400 begins in state 410 where identifying personal information about a person is input into a point-of-sale device. In state 420, the person's birth date is obtained. The person's birth date can be captured either directly from the personal information that was input in state 410 or indirectly, using the personal information from state 420 as a link to a stored copy of the person's birth date. In the embodiment shown in FIG. 4, an expiration date for an identity card used as a source of personal information can also be captured by the process 400 in state 420. In other embodiments, an expiration date for an identity card used as a source of personal information is not be captured by the process 400, or is captured for certain types of personal information sources, or is captured only when available.

In state 430, the process 400 verifies that the read-in of the personal information and the capture of the birth date and expiration date have been accomplished successfully. If the information is determined not to be valid, the process moves to state 440 where a "re-try" message can be displayed to prompt the clerk or the individual to re-enter the personal information, and the process 400 returns to state 410. As will be clear to one of reasonable skill in the art, in some embodiments, the validation step of states 430 and 440 may be omitted or may be executed at a different point in the process 400 without departing from the spirit of the age calculation verification system. Similarly, in some embodiments, an input validation step may be implemented in a different manner. For example, in one embodiment, an identification of an invalid read-in in state 430 causes the process 400 to be aborted or to be referred to a clerk who is facilitating the process 400.

If, in state 430, the process 400 verifies that the read-in of the personal information and the capture of the birth date and expiration date have been accomplished successfully, the process 400 moves to state 450, where the process 400 retrieves and/or calculates the current date. In one embodiment, the current date is calculated using information received from an internal clock. In other embodiments, the current date can be determined using other methods.

In state 310, the person's birth date is captured, either directly from the personal information that was input in state 305, or indirectly, using the personal information as a link to stored information comprising the person's birth date.

Moving on to state 451, the process 400 verifies the validity of the source of the personal information. For example, in one embodiment, the process 400 compares the expiration date of the identity card with the calculated current date. In state 452, the process 400 determines whether the expiration date has passed. If the expiration date has passed, the process 400 moves on to state 453 where an "expired" message is displayed to the clerk and/or to the individual, and, in one embodiment, the process ends in state 495.

A practitioner of ordinary skill in the art will appreciate that states 451–453, in which the expiration date is checked, may reasonably be omitted in some embodiments of the authorization verification system.

If, in state 452, the process 400 determines that the identity card has not expired, the process 400 moves on to state 460 where the process 400 compares the person's birth date with the current date and calculates the person's current age.

In state 470, the process 400 can, in some embodiments, display the individual's age in a visual display and/or in a printed display, as on a paper receipt 150, as is exemplified in FIG. 1A and FIG. 6, or in some other manner.

In state 480, the process 400 stores the age information along with associated transaction data in a transaction storage location 250. For example, in one embodiment, the process 400 may record the calculated age together with a timestamp indicative of the time at which the age was calculated. FIG. 5B below depicts in greater detail one example of the types of data that may be stored with respect to an age calculation. The storage of age calculation data in state 480 allows for a subsequent retrieval of the data and for verification that age calculation procedures or other authorization determination procedures were executed for a given transaction or encounter.

From state 480, the process 400 to calculate age at a point-of-sale device next moves on to state 495 and ends.

In some embodiments, age calculation data that is stored in the transaction storage location 250 may be stored on a temporary basis. In one embodiment, the information is stored as a log of age calculation activity and is purged daily. In other embodiments, the log of age calculation activity can be purged weekly, or at other intervals, or as deemed desirable. Still other embodiments provide for the storage of age calculation information as part of a normally saved record that is stored for every sales transaction.

In one embodiment, the age calculation process 400 may advantageously be implemented as one or more modules that can be configured to execute on one or more processors. The modules may comprise, but are not limited to, any of the following: software or hardware components such as software object-oriented software components, class components and task components, processes methods, functions, attributes, procedures, subroutines, segments of program code, drivers, firmware, microcode, circuitry, data, databases, data structures, tables, arrays, or variables.

FIG. 5A depicts one example of a products database 500 that can be used to identify items that are associated with an authorization threshold. The sample database 500 of FIG. 5A comprises records 505–509 for items available for purchase, the records 505–509 comprising at least four fields 501–504. In the embodiment depicted, the records 505–509 are indexed according to bar code symbols and bar code numbers which are stored in the bar code field 501 if each record 505–509. Thus, in embodiments configured to receive input from bar code scanners, records 505–509 associated with items that have been scanned at the point of sale are easy to locate in the products database 500.

As depicted in FIG. 5A, the products database 500 comprises other fields of information useful to the normal operation of a point of sale. For example, a retail price field 502 stores information that is indicative of a retail price 502 associated with each item. A taxable field 503 stores information indicative of whether the item is taxable. Other fields of information may also be included in the products database 500 without detracting from the spirit of the authorization verification systems and methods described herein.

As depicted in FIG. 5A, the products database 500 further comprises an authorization threshold field 504 that indicates an age threshold, if any exists, that is associated with each item. As depicted in FIG. 5A, two records 506, 507 indicate no authorization threshold for the associated items, two records 505, 509 indicate an authorization threshold of age eighteen for the associated items, and one record 508 indicates an authorization threshold of age twenty-one for the associated items. Thus, in the embodiment shown in FIG. 5A, the authorization threshold field 504 provides information about both whether an age-restriction is associated with an item and, if so, about the value of the age-related authorization threshold itself.

In the embodiment depicted in FIG. 5A, no numeric value is listed in the authorization threshold field 504 of records 506, 507 for which no authorization restriction exists. In other embodiments, the lack of an authorization restriction for an item associated wit,h a given record may be indicated in other ways, as, for example, by a numeric value in the authorization threshold field 504. For example, a product with no minimum age restriction may have an authorization threshold value of age zero. In other embodiments, information in the authorization threshold field 504 may be configured in various other ways, as will be familiar to one of ordinary skill in the art.

Furthermore, in some embodiments, such as in the embodiment of FIG. 5A, the threshold field 504 may provide information about a threshold that is a numeric value that can be used to delimit individuals who are authorized from individuals who are not authorized, such as with a minimum age limit or a maximum age limit. In other embodiments, the threshold field 504 may provide information about a threshold that defines a range of numeric values, such as the case in which residents within a range of zip codes are authorized to take advantage of a special offer. Similarly, a plurality of individual zip codes may comprise an authorization threshold that authorizes access to an offering, and authorization thresholds are envisioned in which the authorization threshold is defined in terms that are alphabetic or otherwise categorized in a scheme that is not directly numeric. As will be familiar to one of ordinary skill in the art, various other configurations of authorization thresholds are possible without departing from the spirit of the authorization verification systems and methods described herein.

As depicted in FIG. 5A, the information stored about individual items in the products database 500 can be used to determine the authorization threshold value for a given purchase transaction as a whole. For example, if a purchase comprises the five items associated with the five records 505–509 of the database 500, and if authorization for the purchase is based on a minimum age limit, then it can be easily ascertained that the minimum authorized age for making the five-item purchase is twenty-one, the threshold age associated with record 508. In other words, the highest age threshold associated with any of the records 505–509 is the minimum authorized age for making the purchase.

In other embodiments of the authorization verification systems and methods, other processes may be used to determine an authorization threshold for a transaction from the authorization thresholds accessed for the individual items of the transaction. Similarly, embodiments of a threshold determination process may variously define a range of values that authorize a transaction, such as a range that encompasses all of the individual thresholds or a range that is the intersection of all of the individual thresholds or a range that is defined in another way. Other processes may also be used to determine a threshold value or threshold range or threshold ranges that authorize a purchase or other transaction.

As will be familiar to one of ordinary skill in the art, the configuration and contents of the products database 500 shown in FIG. 5A are only one example of data that may be used by the authorization verification systems and methods. Other configurations and types of data are also envisioned as being used without departing from the systems and methods described herein.

FIG. 5B depicts one example of a report 520 that can be generated in association with the age verification systems and methods described herein. This example is an age calculation report 520 based on data that is stored in association with an age calculation at a point-of-sale transaction. The sample report 520 depicted in FIG. 5B comprises six fields of information 510–515. A date field 510 lists the date of a given transaction. For example, the date fields 510 of the report 505 of FIG. 5B indicate that the transactions recorded therein all took place on Sep. 4, 2002. A time field 511 lists the time that a transaction took place. In some embodiments, the date field 510 and time field 511 are used to uniquely or near-uniquely identify a given transaction. In embodiments where age calculation records are purged on a daily basis, a time field 511 alone may be sufficient to uniquely or near-uniquely identify a given transaction.

In FIG. 5B, a transaction identification field 512 records a unique identifier for each transaction. A customer identification field 513 can optionally store a number, code, or other identification indicator associated with the source of personal identifying information 220 for a customer in transaction. For example, the customer identification field 513 may store the number of a driver's license offered by a customer as a source of birth date information. Customer identification information stored as part of a transaction record may be useful for a variety of purposes, but privacy protection legislation or business practices may preclude the storage of customer identification information 513 in some situations.

As further depicted in FIG. 5B, an item types field 514 may store information about the types of age-controlled items that a given purchase transaction comprised. In one embodiment, items are categorized into types that are relevant to authorization thresholds associated with the items. In one embodiment, items are categorized into types that conform to the existing business practices of the merchant offering the items for sale. In other embodiments, items are categorized into other type classifications. Such information may be relevant to determining whether a customer's calculated age was sufficient to allow for a given purchase, because different minimum authorized ages may be associated with different age-controlled items. For example, in some locations, a customer may purchase tobacco products at age eighteen or older, but must be twenty-one years of age or older in order to purchase liquor products. The example code depicted in the item types field 514 of FIG. 5B employs a binary code to indicate which types of products were purchased in a given transaction, where the columns of the code, reading from left to right indicate: tobacco, alcohol, adult-content, and gambling (lottery) products, respectively. In any given column, a "1" indicates that a product of the associated type was included is the purchase, while a "0" indicates that no product of the associated type was included in the purchase. Thus, a code of "1000" can be used to indicate that tobacco products were the only age-controlled products in the given transaction, so that a customer aged eighteen or older maybe allowed to make the purchase. Using the same system, a code of "0101" can be used to indicate that the customer purchased both an alcoholic beverage and a lottery ticket, requiring a minimum age of twenty-one for the combined purchase.

An age field 515 stores the age that was calculated by the age calculation process 400 in association with a given transaction.

FIG. 5C depicts a second example of a report 550 that can be generated based on data that is stored in association with an age calculation at a point-of-sale transaction. The sample report depicted in FIG. 5C comprises five fields of information 560–564. This report 550 uses the same code for the item types field 563 as was described with reference to the item types field 514 in FIG. 5B. In the embodiment depicted in FIG. 5C, personal information to identify the customer is not stored in the age calculation report 550. However, information identifying the date 560, time 561, and transaction number 562 for a given transaction are stored, along with information about the types of items 563 in the transaction for which authorization is desired, and the age 564 of the customer participating in the transaction. Thus, a retrievable record is made of an authorization determination at a point-of-sale transaction that can be used to subsequently verify that the authorization took place for the given transaction.

As will be obvious to one of ordinary skill in the art, some, all, or none of these and/or other types of data may be stored as a record of an authorization determination procedure that is performed for a given transaction, depending on the given situation in which it is performer. For example, in some embodiments, as was shown in FIGS. 5B and 5C, an actual age or other authorization parameter may be included in a report or written record of an authorization determination. In other embodiments, a flag, symbol, or other indicia communicates the successful authorization (or lack thereof for a given encounter. For example, in one embodiment, the transactions log comprises transaction records, each of which comprise a transaction identifier and an authorization indicator of "OK" or "FAIL." Such an authorization indicator can also be displayed on a sales receipt associated with an authorization determination. In one embodiment where authorization is based on age, the transactions log comprises records, each of which comprise a transaction date and time and an age. In some embodiments, the transaction storage 250 comprises a record for each transaction; in some embodiments, the transaction storage 250 comprises a record for each transaction for which an authorization determination was performed. In some embodiments, the record in the transaction storage 250 comprises information about the authorization threshold determined to be appropriate for the transaction associated with the record. In some embodiments, the record in the transaction storage 250 comprises identifying information about the point-of-sale device, the local computer 270, or other device used in conjunction with the authorization verification systems and methods.

FIG. 6 depicts an example of a sales receipt 600 printed in conjunction with a sales transaction for which an age calculation was performed. In the sample sales receipt 600 of FIG. 6, a printed record of the customer's calculated age 610 is printed at the bottom of the sales receipt 600. Such a receipt 600 provides a written indication that an age calculation, as may be mandated by law, was carried out for the sales transaction.

An authorization verification system has been described herein with particular applications associated with point-of-sale and e-commerce transactions. However, it is foreseen that the techniques described will have wider applications. Therefore, while certain embodiments of the inventions have been described, these embodiments have been presented by way of example only, and are not intended to limit the scope of the inventions to the specific forms, arrangement of parts, sequence of steps, or particular applications described and shown. Indeed, the novel methods and systems described herein may be embodied in a variety of other forms. Furthermore, various omissions, substitutions, and changes in the form of the methods and systems described herein may be made without departing from the spirit of the invention. The accompanying claims and their equivalents are intended to cover such forms or modifications as would fall within the scope and spirit of the invention.

What is claimed is:

1. A process for determining an age-related authorization threshold for a purchase comprising at least one item, the process comprising:
   (i) identifying an item that a purchaser is attempting to purchase;
   (ii) identifying an age-related authorization threshold associated with the item;
   (iii) repeating acts (i) and (ii) for the items of the purchase;
   (iv) selecting an authorization threshold to be the authorization threshold for the purchase;
   (v) calculating the age of the purchaser; and
   (vi) storing in a memory a record indicative of the purchase and of the calculated age of the purchaser.

2. The process of claim 1, wherein identifying an item that a purchaser is attempting to purchase comprises receiving an electronic identifier signal associated with the item, and wherein identifying an age-related authorization threshold associated with the item comprises using the electronic identifier to access stored information about an age-related authorization threshold associated with the item.

3. The process of claim 1, wherein selecting an authorization threshold comprises selecting one of the identified authorization thresholds to be the authorization threshold for the purchase.

4. The process of claim 1, wherein selecting an authorization threshold comprises selecting a highest authorization threshold from amongst the authorization thresholds identified for the items in the purchase.

5. The process of claim 1, wherein selecting an authorization threshold comprises selecting a lowest authorization threshold from amongst the authorization thresholds identified for the items in the purchase.

6. The process of claim 1, wherein an authorization threshold defines a range of authorized ages for purchase of an item, and wherein selecting an authorization threshold for the purchase comprises selecting an authorization threshold that defines the broadest range from amongst the authorization thresholds identified for the items in the purchase.

7. The process of claim 1, wherein an authorization threshold defines a range of authorized ages for purchase of an item, and wherein selecting an authorization threshold for the purchase comprises selecting an authorization threshold that defines the narrowest range from amongst the authorization thresholds identified for the items in the purchase.

8. The process of claim 1, wherein an authorization threshold defines a range of authorized ages for purchase of an item, and wherein selecting an authorization threshold for the purchase comprises defining an authorization threshold whose range encompasses the authorization threshold ranges identified for the items in the purchase.

9. The process of claim 1, wherein an authorization threshold defines a range of authorized ages for purchase of an item, and wherein selecting an authorization threshold for the purchase comprises defining an authorization threshold whose range is the intersection of the authorization threshold ranges Identified for the items in the purchase.

10. The process of claim 1, wherein calculating the age of the purchaser comprises:
    obtaining birth date identification information about the purchaser;
    obtaining information that can be used to determine the current date; and
    using the birth date identification information and the current date information to calculate the current age of the purchaser.

11. The process of claim 10, wherein obtaining birth date identification information about the purchaser comprises receiving information entered using at least one of the methods comprising: scanning in, reading electronically, keying in manually, and inputting orally.

12. The process of claim 10, wherein obtaining birth date identification information about the purchaser comprises obtaining information from at least one of: magnetically encoded information on an identification card, a driver's license, a smart card, a bar code, a transponder, a cell phone, a personal digital assistant, a security key, a computer file, a fingerprint of the purchaser, an iris scan of the purchaser, a voice sample of the purchaser, and other biometric information available from the purchaser.

13. The process of claim 10, wherein obtaining birth date identification information about the purchaser comprises obtaining information that allows access to a stored record of the purchaser's birth date.

14. The process of claim 1, wherein storing a record in memory comprises storing the calculated age of the purchaser.

15. The process of claim 1, wherein storing a record in memory comprises storing the age-related authorization threshold for the purchase.

16. The process of claim 1, wherein storing a record in memory comprises storing an identifier for the transaction.

17. The process of claim 16, wherein storing an identifier for the transaction comprises recording at least one of: the time of the transaction, the date of the transaction, and a numeric identifier for the transaction.

18. The process of claim 1, wherein storing a record in memory comprises storing at least one of the group comprising: an identification indicator for the purchaser, an identification indicator for a clerk assisting with the purchase, an amount of the purchase, an indication of the items purchased, and an indication of item types associated with the purchase.

19. The process of claim 1, further comprising comparing the calculated age of the purchaser and the selected age-related authorization threshold for the purchase.

20. The process of claim 1, wherein an age-related authorization threshold for a purchase delimits ages of purchasers who are authorized to make the purchase and ages of purchasers who are not authorized to make the purchase.

21. The process of claim 20, further comprising:
comparing the calculated age and the selected age-related authorization threshold; and
not allowing the purchase to be completed if the calculated age indicates that the purchaser is not authorized to make the purchase.

22. The process of claim 1, further comprising displaying the calculated age of the purchaser to a clerk associated with the purchase.

23. A point of sale device for determining an age-related authorization threshold for a purchase that comprises a plurality of items, the point of sale device comprising:
an item identifier apparatus configured to identify items that a purchaser is attempting to purchase;
a computer memory configured to store a database of age-related authorization information regarding items available for purchase, the information comprising identification information for the items and age-related authorization thresholds associated with the items, wherein at least two different age-related authorization thresholds exist; and
a computer processor configured to receive a plurality of signals from the item identifier apparatus that identify the plurality of items of the purchase, wherein the computer processor is further configured to use the received item identifier signals to access the database of age-related authorization information in the computer memory and to select, based at least in part on the age-related authorization information, an age-related authorization threshold that authorizes the purchase of the items.

24. The device of claim 23, wherein the computer processor is further configured to determine an age-related authorization threshold that authorizes the purchase by selecting one of the accessed authorization thresholds for the identified items of the purchase to be the age-related authorization threshold that authorizes the purchase of the items.

25. The device of claim 24, wherein the computer processor is further configured to select an authorization threshold by selecting a highest authorization threshold from amongst the authorization thresholds identified for the items in the purchase.

26. The device of claim 24, wherein the computer processor is further configured to select an authorization threshold by selecting a lowest authorization threshold from amongst the authorization thresholds identified for the items in the purchase.

27. The device of claim 23, wherein the computer memory is further configured to store for each item in the database an age-related authorization threshold that defines a range of authorized ages for purchase of the item, and wherein the computer processor is further configured to select an authorization threshold to authorize the purchase by selecting an authorization threshold that defines the broadest range from amongst the authorization thresholds identified for the items in the purchase.

28. The device of claim 23, wherein the computer memory is further configured to store for each item in the database an age-related authorization threshold that defines a range of authorized ages for purchase of the item, and wherein the computer processor is further configured to select an authorization threshold to authorize the purchase by selecting an authorization threshold that defines the narrowest range from amongst the authorization thresholds identified for the items in the purchase.

29. The device of claim 23, wherein the computer memory is further configured to store for each item in the database an age-related authorization threshold that defines a range of authorized ages for purchase of the item, and wherein the computer processor is further configured to select an authorization threshold to authorize the purchase by defining an authorization threshold whose range encompasses the authorization threshold ranges identified for the items in the purchase.

30. The device of claim 23, wherein the computer memory is further configured to store for each item in the database an age-related authorization threshold that defines a range of authorized ages for purchase of the item, and wherein the computer processor is further configured to select an authorization threshold to authorize the purchase by defining an authorization threshold whose range is the intersection of the authorization threshold ranges identified for the items in the purchase.

31. The device of claim 23, further comprising:
a data input apparatus configured to receive personal information about the purchaser and to transmit the information to the computer processor;
a clock configured to transmit to the computer processor information indicative of the current time and date; and
wherein the computer processor is further configured to use the personal information and the current date information to calculate the current age of the purchaser.

32. The device of claim 31, wherein the data input apparatus is further configured to obtain the personal information about the purchaser by receiving information entered using at least one of the methods comprising: scanning in, reading electronically, keying in manually, and inputting orally.

33. The device of claim 31, wherein the data input apparatus is further configured to obtain the personal information about the purchaser by obtaining information from at least one of: magnetically encoded information on an identification card, a driver's license, a smart card, a bar code, a transponder, a cell phone, a personal digital assistant, a security key, a computer file, a fingerprint of the purchaser, an iris scan of the purchaser, a voice sample of the purchaser, and other biometric information available from the purchaser.

34. The device of claim 31, wherein the data input apparatus Is further configured to input information that can be used by the computer processor to access a stored record of the purchaser's birth date.

35. The device of claim 31, wherein the age-related authorization threshold for the purchase delimits ages of purchasers who are authorized to make the purchase and ages of purchasers who are not authorized to make the purchase, and wherein the computer processor is further configured to compare the current age of the purchaser to the age-related authorization threshold for the purchase to determine if the purchaser is authorized to purchase the items.

36. The device of claim 35, wherein the computer processor is further configured to store in a computer memory a record of the purchase that comprises an identifier for the purchase and a record of the age calculation.

37. The device of claim 36, wherein the computer processor is further configured to not allow the purchase to be completed if the calculated age indicates that the purchaser is not authorized to make the purchase.

38. The device of claim 23, further comprising a display apparatus for displaying the calculated age of the purchaser to a clerk associated with the purchase.

39. A computerized system for determining an age-related authorization threshold for a purchase comprising a plurality of items, the system comprising:
   means for obtaining electronic identifiers for a plurality of items that a purchaser is attempting to purchase;
   means for using the electronic identifiers to access a database of age-related authorization information associated with the items, wherein an item may be associated with one of at least two age-related authorization thresholds; and
   means for determining that select, based at least in part on the age-related authorization information, an age-related authorization threshold that authorizes the purchase of the items.

40. The system of claim 39, wherein the means for obtaining electronic identifiers for items that a purchaser is attempting to purchase comprise means for receiving electronic identifier signals associated with the items.

41. The system of claim 39, wherein the age-related authorization information comprises age-related authorization thresholds associated with items available for purchase, and wherein the means for determining an age-related authorization threshold that authorizes the purchase of the items comprise means for selecting one of the accessed authorization thresholds to be the authorization threshold that authorizes the purchase of the items.

42. The system of claim 41, wherein the means for determining an age-related authorization threshold for the purchase further comprise means for selecting a highest authorization threshold from amongst the authorization thresholds identified for the items in the purchase.

43. The system of claim 41, wherein the means for determining an age-related authorization threshold for the purchase further comprise means for selecting a lowest authorization threshold from amongst the authorization thresholds identified for the items in the purchase.

44. The system of claim 39, wherein an authorization threshold defines a range of authorized ages for purchase of an item, and wherein the means for determining an age-related authorization threshold for the purchase comprise means for selecting an authorization threshold that defines the broadest range from amongst the authorization thresholds identified for the items in the purchase.

45. The system of claim 39, wherein an authorization threshold defines a range of authorized ages for purchase of an item, and wherein the means for determining an age-related authorization threshold for the purchase comprise means for selecting an authorization threshold that defines the narrowest range from amongst the authorization thresholds identified for the items in the purchase.

46. The system of claim 39, wherein an authorization threshold defines a range of authorized ages for purchase of an item, and wherein the means for determining an age-related authorization threshold for the purchase comprise means for defining an authorization threshold whose range encompasses the authorization threshold ranges identified for the items in the purchase.

47. The system of claim 39, wherein an authorization threshold defines a range of authorized ages for purchase of an item, and wherein the means for determining an authorization threshold for the purchase comprise means for defining an authorization threshold whose range is the intersection of the authorization threshold ranges identified for the items in the purchase.

48. A software module that gives a device the capability to:
   obtain electronic identifiers for a plurality items that a purchaser is attempting to purchase;
   use the electronic identifiers to access a database of age-related authorization information associated with the items, wherein the age-related authorization information associated with an item comprises one of at least two ape-related thresholds; and
   determine, based at least in part on the age-related authorization information, an age-related authorization threshold that authorizes the purchase of the items.

49. The software module of claim 48, wherein the software module further gives the device the capability to access age-related authorization thresholds associated with the item in the database.

50. The software module of claim 49, wherein the software module further gives the device the capability to select one of the accessed authorization thresholds to be the authorization threshold that authorizes the purchase.

51. The software module of claim 50, wherein the software module further gives the device the capability to select a highest authorization threshold from amongst the accessed authorization thresholds to be the authorization threshold that authorizes the purchase.

52. The software module of claim 50, wherein the software module further gives the device the capability to select a lowest authorization threshold from amongst the accessed authorization thresholds to be the authorization threshold that authorizes the purchase.

53. The software module of claim 49, wherein an authorization threshold defines a range of authorized ages for purchase of an item, and wherein the software module further gives the device the capability to select an authorization threshold that defines the broadest range from amongst the authorization thresholds identified for the items in the purchase.

54. The software module of claim 49, wherein an authorization threshold defines a range of authorized ages for purchase of an item, and wherein the software module further gives the device the capability to select an authorization threshold that defines the narrowest range from amongst the authorization thresholds identified for the items in the purchase.

55. The software module of claim 49, wherein an authorization threshold defines a range of authorized ages for purchase of an item, and wherein the software module further gives the device the capability to define an authorization threshold for the purchase whose range encompasses the authorization threshold ranges identified for the items in the purchase.

56. The software module of claim 49, wherein an authorization threshold defines a range of authorized ages for purchase of an item, and wherein the software module further gives the device the capability to define an authorization threshold for the purchase whose range is the intersection of the authorization threshold ranges identified for the items in the purchase.

57. A computerized process for determining an age-related authorization threshold for a purchase comprising a plurality of items, the process comprising:
  obtaining electronic identifiers for a plurality of items that a purchaser is attempting to purchase;
  using the electronic identifiers to access a database of age-related authorization information associated with the items, wherein an item may be associated with one of at least two age-related authorization thresholds; and
  determining, based at least in part on the age-related authorization information, an age-related authorization threshold that authorizes the purchase of the items.

58. A point-of-sale device for determining an age-related authorization threshold for a purchase comprising at least one item, the point-of-sale device comprising:
  an item identifier apparatus configured to transmit identifying electronic signals associated with items that a purchaser wishes to purchase;
  a database of age-related authorization threshold information for items available for purchase;
  a table of electronically stored records associated with age calculations performed in association with purchases; and
  a computer processor configured to receive the item-identifying signals from the item identifier apparatus, to use the item-identifying signals to access in the database age-related authorization threshold information that is related to the items in the purchase, and to select one of the accessed age-related authorization thresholds to be the age-related authorization threshold for the purchase, wherein the computer processor is further configured to calculate the age of the purchaser and to store in the table a record indicative of the purchase and of the calculated age of the purchaser.

59. A process for determining an authorization threshold for a purchase comprising at least one item, the process comprising:
  (i) identifying an item associated with a purchase;
  (ii) accessing stored information about the item that is indicative of an authorization threshold associated with the item;
  (iii) repeating steps (i) and (ii) for each of the items in the purchase; and
  (iv) selecting one of the thresholds to be the authorization threshold for the purchase.

60. A point of sale device for determining an age-related authorization threshold for a purchase that comprises a plurality of items, the point of sale device comprising:
  an item identifier apparatus configured to identify items that a purchaser is attempting to purchase;
  a computer memory configured to store a database of age-related authorization information regarding items available for purchase, the information comprising identification information for the items and age-related authorization thresholds associated with the items; and
  a computer processor configured to receive a plurality of signals from the item identifier apparatus that identify the plurality of items of the purchase, wherein the computer processor is further configured to use the received item identifier signals to access the database of age-related authorization information in the computer memory and to determine, based at least in part on the age-related authorization information, an age-related authorization threshold that authorizes the purchase of the items, wherein the computer processor is further configured to determine an age-related authorization threshold that authorizes the purchase by selecting one of the accessed authorization thresholds for the identified items of the purchase to be the age-related authorization threshold that authorizes the purchase of the items.

61. The device of claim 60, wherein the computer processor is further configured to select an authorization threshold by selecting a highest authorization threshold from amongst the authorization thresholds identified for the items in the purchase.

62. The device of claim 60, wherein the computer processor is further configured to select an authorization threshold by selecting a lowest authorization threshold from amongst the authorization thresholds identified for the items in the purchase.

63. A point of sale device for determining an age-related authorization threshold for a purchase that comprises a plurality of items, the point of sale device comprising:
  an item identifier apparatus configured to identify items that a purchaser is attempting to purchase;
  a computer memory configured to store a database of age-related authorization information regarding items available for purchase, the information comprising identification information for the items and age-related authorization thresholds associated with the items, wherein the computer memory is further configured to store for each item in the database an age-related authorization threshold that defines a range of authorized ages for purchase of the item; and
  a computer processor configured to receive a plurality of signals from the item identifier apparatus that identify the plurality of items of the purchase, wherein the computer processor is further configured to use the received item identifier signals to access the database of age-related authorization information in the computer memory and to determine, based at least in part on the age-related authorization information, an age-related authorization threshold that authorizes the purchase of the items, and wherein the computer processor is further configured to select an authorization threshold to authorize the purchase by selecting an authorization threshold that defines the broadest range from amongst the authorization thresholds identified for the items in the purchase.

64. A point of sale device for determining an age-related authorization threshold for a purchase that comprises a plurality of items, the point of sale device comprising:
  an item identifier apparatus configured to identify items that a purchaser is attempting to purchase;
  a computer memory configured to store a database of age-related authorization information regarding items available for purchase, the information comprising identification information for the items and age-related authorization thresholds associated with the items, wherein the computer memory is further configured to store for each item in the database an age-related authorization threshold that defines a range of authorized ages for purchase of the item; and a computer processor configured to receive a plurality of signals from the item identifier apparatus that identify the plurality of items of the purchase, wherein the computer processor is further configured to use the received item identifier signals to access the database of age-related authorization information in the computer memory and to determine, based at least in part on the age-related authorization information, an age-related authorization threshold that authorizes the purchase of the items, and wherein the computer processor is further configured to select an authorization threshold to authorize the purchase by selecting an authorization threshold that defines the narrowest range from amongst the authorization thresholds identified for the items in the purchase.

65. A point of sale device for determining an age-related authorization threshold for a purchase that comprises a plurality of items, the point of sale device comprising:

an item identifier apparatus configured to identify items that a purchaser is attempting to purchase;

a computer memory configured to store a database of age-related authorization information regarding items available for purchase, the information comprising identification information for the items and age-related authorization thresholds associated with the items, wherein the computer memory is further configured to store for each item in the database an age-related authorization threshold that defines a range of authorized ages for purchase of the item; and a computer processor configured to receive a plurality of signals from the item identifier apparatus that identify the plurality of items of the purchase, wherein the computer processor is further configured to use the received item identifier signals to access the database of age-related authorization information in the computer memory and to determine, based at least in part on the age-related authorization information, an age-related authorization threshold that authorizes the purchase of the items, and wherein the computer processor is further configured to select an authorization threshold to authorize the purchase by defining an authorization threshold whose range encompasses the authorization threshold ranges identified for the items in the purchase.

66. A point of sale device for determining an age-related authorization threshold for a purchase that comprises a plurality of items, the point of sale device comprising:

an item identifier apparatus configured to identify items that a purchaser is attempting to purchase;

a computer memory configured to store a database of age-related authorization information regarding items available for purchase, the information comprising identification information for the items and age-related authorization thresholds associated with the items, wherein the computer memory is further configured to store for each item in the database an age-related authorization threshold that defines a range of authorized ages for purchase of the item; and a computer processor configured to receive a plurality of signals from the item identifier apparatus that identify the plurality of items of the purchase, wherein the computer processor is further configured to use the received item identifier signals to access the database of age-related authorization information in the computer memory and to determine, based at least in part on the age-related authorization information, an age-related authorization threshold that authorizes the purchase of the items, and wherein the computer processor is further configured to select an authorization threshold to authorize the purchase by defining an authorization threshold whose range is the intersection of the authorization threshold ranges identified for the items in the purchase.

67. A computerized system for determining an age-related authorization threshold for a purchase comprising a plurality of items, the system comprising:

means for obtaining electronic identifiers for a plurality of items that a purchaser is attempting to purchase, wherein the means for obtaining electronic identifiers for items that a purchaser is attempting to purchase comprise means for receiving electronic identifier signals associated with the items;

means for using the electronic identifiers to access a database of age-related authorization information associated with the items; and means for determining, based at least in part on the age-related authorization information, an age-related authorization threshold that authorizes the purchase of the items.

68. A computerized system for determining an age-related authorization threshold for a purchase comprising a plurality of items, the system comprising:

means for obtaining electronic identifiers for a plurality of items that a purchaser is attempting to purchase;

means for using the electronic identifiers to access a database of age-related authorization information associated with the items, wherein the age-related authorization information comprises age-related authorization thresholds associated with items available for purchase; and means for determining, based at least in part on the age-related authorization information, an age-related authorization threshold that authorizes the purchase of the items, the means for determining comprising means for selecting one of the accessed authorization thresholds to be the authorization threshold that authorizes the purchase of the items.

69. The system of claim 68, wherein the means for determining an age-related authorization threshold for the purchase further comprise means for selecting a highest authorization threshold from amongst the authorization thresholds identified for the items in the purchase.

70. The system of claim 68, wherein the means for determining an age-related authorization threshold for the purchase further comprise means for selecting a lowest authorization threshold from amongst the authorization thresholds identified for the items in the purchase.

71. A computerized system for determining an age-related authorization threshold for a purchase comprising a plurality of items, the system comprising:

means for obtaining electronic identifiers for a plurality of items that a purchaser is attempting to purchase;

means for using the electronic identifiers to access a database of age-related authorization information associated with the items; and means for determining, based at least in part on the age-related authorization information, an age-related authorization threshold that authorizes the purchase of the items, wherein an authorization threshold defines a range of authorized ages for purchase of an item, and wherein the means for determining an age-related authorization threshold for the purchase further comprise means for selecting an authorization threshold that defines the broadest range from amongst the authorization thresholds identified for the items in the purchase.

72. A computerized system for determining an age-related authorization threshold for a purchase comprising a plurality of items, the system comprising:

means for obtaining electronic identifiers for a plurality of items that a purchaser is attempting to purchase;

means for using the electronic identifiers to access a database of age-related authorization information associated with the items; and means for determining, based at least in part on the age-related authorization information, an age-related authorization threshold that authorizes the purchase of the items, wherein an authorization threshold defines a range of authorized ages for purchase of an item, and wherein the means for determining an age-related authorization threshold for the purchase further comprise means for selecting an authorization threshold that defines the narrowest range from amongst the authorization thresholds identified for the items in the purchase.

73. A software module that gives a device the capability to:

obtain electronic identifiers for a plurality items that a purchaser is attempting to purchase;

use the electronic identifiers to access a database of age-related authorization information associated with the items;

determine, based at least in part on the age-related authorization information, an age-related authorization threshold that authorizes the purchase of the items;

access age-related authorization thresholds associated with the item in the database; and select one of the accessed authorization thresholds to be the authorization threshold that authorizes the purchase.

74. The software module of claim 73, wherein the software module further gives the device the capability to select a highest authorization threshold from amongst the accessed authorization thresholds to be the authorization threshold that authorizes the purchase.

75. The software module of claim 73, wherein the software module further gives the device the capability to select a lowest authorization threshold from amongst the accessed authorization thresholds to be the authorization threshold that authorizes the purchase.

76. A software module that gives a device the capability to:

obtain electronic identifiers for a plurality items that a purchaser is attempting to purchase;

use the electronic identifiers to access a database of age-related authorization information associated with the items;

determine, based at least in part on the age-related authorization information, an age-related authorization threshold that authorizes the purchase of the items;

access age-related authorization thresholds associated with the item in the database, wherein an authorization threshold defines a range of authorized ages for purchase of an item; and select an authorization threshold that defines the broadest range from amongst the authorization thresholds identified for the items in the purchase.

77. A software module that gives a device the capability to:

obtain electronic identifiers for a plurality items that a purchaser is attempting to purchase;

use the electronic identifiers to access a database of age-related authorization information associated with the items; and determine, based at least in part on the age-related authorization information, an age-related authorization threshold that authorizes the purchase of the items;

access age-related authorization thresholds associated with the item in the database, wherein an authorization threshold defines a range of authorized ages for purchase of an item; and select an authorization threshold that defines the narrowest range from amongst the authorization thresholds identified for the items in the purchase.

* * * * *

UNITED STATES PATENT AND TRADEMARK OFFICE
CERTIFICATE OF CORRECTION

PATENT NO. : 6,755,344 B1
DATED : June 29, 2004
INVENTOR(S) : Mollett et al.

It is certified that error appears in the above-identified patent and that said Letters Patent is hereby corrected as shown below:

Column 22,
Line 44, delete "Identified" and insert -- identified --.

Column 25,
Line 7, after "apparatus", delete "Is" and insert -- is --.

Column 26,
Line 34, delete "ape-related" and insert -- age-related --.

Signed and Sealed this

Twenty-first Day of March, 2006

JON W. DUDAS
*Director of the United States Patent and Trademark Office*